United States Patent [19]

Young

[11] Patent Number: 4,993,442

[45] Date of Patent: * Feb. 19, 1991

[54] METHODS FOR REMOVING OBSTRUCTIONS FROM CONDUITS USING SULFURIC ACID ADDUCTS

[75] Inventor: Donald C. Young, Fullerton, Calif.

[73] Assignee: Union Oil Company of California, Los Angeles, Calif.

[*] Notice: The portion of the term of this patent subsequent to May 20, 2003 has been disclaimed.

[21] Appl. No.: 416,824

[22] Filed: Oct. 3, 1989

Related U.S. Application Data

[63] Continuation of Ser. No. 50,530, May 13, 1987, abandoned, which is a continuation-in-part of Ser. No. 675,774, Nov. 28, 1984, Pat. No. 4,673,522, and a continuation-in-part of Ser. No. 771,259, Aug. 30, 1985, Pat. No. 4,722,986, and a continuation-in-part of Ser. No. 453,496, Dec. 27, 1982, which is a continuation-in-part of Ser. No. 318,629, Nov. 5, 1981, Pat. No. 4,445,925.

[51] Int. Cl.$^5$ ............... B08B 3/08; C11D 7/08; C11D 7/32; C23G 3/04
[52] U.S. Cl. ............... 134/22.14; 134/3; 134/19; 134/22.11; 134/41; 252/87; 252/142; 252/148
[58] Field of Search ............... 134/3, 19, 22.11, 22.14, 134/41; 252/87, 142, 148

[56] References Cited

U.S. PATENT DOCUMENTS

| | | | |
|---|---|---|---|
| 2,959,555 | 11/1960 | Martin | 252/149 |
| 3,037,887 | 6/1962 | Brenner | 134/22 |
| 3,353,995 | 11/1967 | Teumac | 134/3 |
| 3,458,354 | 7/1969 | Reich | 134/3 |
| 3,779,935 | 12/1973 | McDougall | 252/149 |
| 3,803,042 | 4/1974 | Knox | 252/180 |
| 4,096,871 | 6/1978 | Vlahakis | 134/40 |
| 4,397,675 | 8/1983 | Young | 71/28 |
| 4,402,852 | 9/1983 | Young | 252/182 |
| 4,404,116 | 9/1983 | Young | 252/182 |
| 4,445,925 | 5/1984 | Young | 71/28 |
| 4,447,253 | 5/1984 | Young | 71/28 |
| 4,498,933 | 2/1985 | Berkeley | 134/22.14 |
| 4,512,813 | 4/1985 | Young | 134/27 |
| 4,522,644 | 6/1985 | Young | 71/78 |
| 4,589,925 | 5/1986 | Young | 134/3 |
| 4,626,417 | 12/1986 | Young | 423/235 |
| 4,664,717 | 5/1987 | Young | 127/37 |
| 4,673,522 | 6/1987 | Young | 252/87 |
| 4,686,017 | 8/1987 | Young | 204/45.1 |
| 4,722,986 | 2/1988 | Young | 527/230 |
| 4,743,669 | 5/1988 | Young | 527/200 |
| 4,755,265 | 7/1988 | Young | 204/45.1 |
| 4,801,511 | 1/1989 | Young | 429/198 |
| 4,818,269 | 4/1989 | Young | 71/83 |
| 4,831,056 | 6/1989 | Young | 515/588 |
| 4,834,788 | 5/1989 | Young | 71/83 |
| 4,839,088 | 6/1989 | Young . | |
| 4,877,869 | 10/1989 | Young . | |
| 4,885,425 | 12/1989 | Young . | |

OTHER PUBLICATIONS

Donald C. Young, U.S. Ser. No. 06/453,496, filed Dec. 27, 1982 for Acid Catalyzed Reactions and Compositions for Use Therein.
Donald C. Young, U.S. Ser. No. 06/673,508, filed Nov. 20, 1984 for Thermally Stable Urea-Sulfuric Acid Compositions and Methods for Manufacture.
Donald C. Young, U.S. Ser. No. 07/149,702, filed Jan. 29, 1988 for Acid Catalysts and Methods of Use.
Donald C. Young, U.S. Ser. No. 07/116,472, filed Nov. 3, 1987 for Systemic Herbicides and Methods of Use.
Donald C. Young, U.S. Ser. No. 07/149,424, filed Jan. 29, 1988 for Acid Catalyzed Reduction.
Donald C. Young, U.S. Ser. No. 07/149,431, filed Jan. 29, 1988 for Friedel-Crafts Reactions.
Donald C. Young, U.S. Ser. No. 07/311,232, filed Feb. 15, 1989 for Methods for Treating Cellulosic Materials.
Donald C. Young, U.S. Ser. No. 07/313,188, filed Feb. 21, 1989 for Cellulosic Compositions.
Donald C. Young, U.S. Ser. No. 07/329,644, filed Mar. 28, 1989 for Scarifying Plant Seeds.
Donald C. Young, U.S. Ser. No. 07/149,735, filed Jan. 29, 1988 for Methods for Acid-Catalyzed Reactions.
Donald C. Young, U.S. Ser. No. 07/150,026, filed Jan. 29, 1988 for Isomerization.

(List continued on next page.)

Primary Examiner—Dennis Albrecht
Attorney, Agent, or Firm—Gregory F. Wirzbicki; Michael H. Laird

[57] ABSTRACT

Acid-soluble and/or hydrolyzable obstructions are removed from conduits by contacting such obstructions with a composition containing the reaction product of sulfuric acid and a chalcogen-containing compound having the empirical formula $R_1 - CX - R_2$ wherein X is a chalcogen, $R_1$ and $R_2$ are independently chosen from hydrogen, $NR_3R_4$ or $NR_5$, with at least one of $R_1$ and $R_2$ being other than hydrogen, $R_3$ and $R_4$ are independently chosen from hydrogen or monovalent organic radicals, and $R_5$ is a divalent organic radical. Preferably, the molar ratio of the chalcogen-containing compound to sulfuric acid is about ¼ or more. Compositions particularly useful for removing deposits containing hydrolyzable constituents have chalcogen compound/sulfuric acid molar ratios less than 2. The compositions may optionally contain other components such as surfactants and/or non-aqueous polar solvents which accentuate their activity toward hydrophobic materials. Compositions which have $H_2O$/(chalcogen compound + $H_2SO_4$) molar ratios below about 2.5 are particularly useful for removing obstructions by partial or complete hydrolysis. Urea is a most preferred chalcogen-containing compound.

16 Claims, No Drawings

OTHER PUBLICATIONS

Donald C. Young, U.S. Ser. No. 07/150,076, filed Jan. 29, 1988 for Acid-Catalyzed Oxidative Reactions.
Donald C. Young, U.S. Ser. No. 07/150,077, filed Jan. 29, 1988 for Demetallizing Organometallic Compounds.
Donald C. Young, U.S. Ser. No. 07/150,079, filed Jan. 29, 1988 for Acid-Catalyzed Polymerization.
Donald C. Young, U.S. Ser. No. 06/783,368, filed Oct. 3, 1985 for Herbicidal Compositions.
Donald C. Young, U.S. Ser. No. 07/150,230, filed Jan. 29, 1988 for Acid-Catalyzed Reactions.
Donald C. Young, U.S. Ser. No. 07/235,005, filed Aug. 22, 1988 for Vegetation Control.
Donald C. Young, U.S. Ser. No. 07/235,799, filed Aug. 22, 1988 for Methods for Controlling Vegetation.
Donald C. Young, U.S. Ser. No. 07/236,344, filed Aug. 22, 1988 for Systemic Herbicidal Compositions and Methods of Use.
Donald C. Young, U.S. Ser. No. 07/150,224, filed Jan. 29, 1988 for Esterification.
Donald C. Young, U.S. Ser. No. 07/305,847, filed Feb. 2, 1989 for Methods for Facilitating the Harvest of Food Crops.
Donald C. Young, U.S. Ser. No. 07/329,840, filed Mar. 28, 1989 for Plant Seed Compositions.
Donald C. Young, U.S. Ser. No. 07/343,489, filed Apr. 25, 1989 for Pesticidal Compositions and Methods for Controlling Pests.
Donald C. Young, U.S. Ser. No. 07/423,682, filed Oct. 18, 1989 for Monourea-Sulfuric Acid Adduct Compositions.

METHODS FOR REMOVING OBSTRUCTIONS FROM CONDUITS USING SULFURIC ACID ADDUCTS

RELATED APPLICATIONS

This application is a continuation, of application Ser. No. 07/050,530, filed 5/13/87, now abandoned, is a continuation-in-part of my copending application Ser. No. 675,774, METHODS FOR REMOVING OBSTRUCTIONS FROM CONDUITS WITH UREA-SULFURIC ACID COMPOSITIONS, filed Nov. 28, 1984; now U.S. Pat. No. 4,673,522 Ser. No. 771,259, ACID CATALYSTS AND METHODS OF USE, filed Aug. 30, 1985, now U.S. Pat. No. 4,722,986 and Ser. No. 453,496, ACID-CATALYZED REACTIONS AND COMPOSITIONS FOR USE THEREIN, filed Dec. 27, 1982, which was a continuation-in-part of then copending application Ser. No. 318,629, METHODS OF PRODUCING CONCENTRATED UREA-SULFURIC ACID REACTION PRODUCTS, filed Nov. 5, 1981, now U.S. Pat. No. 4,445,925.

BACKGROUND

1. Field of the Invention

This invention relates to the field of conduit obstruction removal, and in particular it relates to methods for removing obstructions from the interior of conduits.

2. Description of the Art

Fluid-handling conduits, including industrial, municipal, household, and agricultural process and water inlet and drain lines, as well as inline equipment such as orifices, nozzles, valves, screens, filters, metering devices, heat exchangers, etc., often become fouled or completely plugged with organic or inorganic debris, impurities, corrosion, and/or components of the fluid customarily passed through the conduit. A variety of physical and chemical procedures and compositions have been devised to dissolve or physically dislodge most if not all types of such organic and inorganic obstructions. For instance, it is known that acids, such as sulfuric acid, will dissolve a variety of inorganic deposits such as metal salts, carbonates, and other materials and that they will chemically attack and weaken a variety of organic deposits thereby facilitating the removal of such deposits.

Sulfuric acid is one of the strongest, readily available acids and, but for a number of significant disadvantages associated with use of sulfuric acid, it is an ideal candidate for the removal of obstructions from conduits. However, sulfuric acid is highly corrosive and therefore difficult to handle, and it can cause severe corrosive damage to conduits and in-line equipment. It promotes a variety of side reactions with many materials including dehydration, sulfonation, and oxidation, in which it is consumed, thereby eliminating its activity as an active chemical agent. Its heat of dilution in many solvents, particularly in water, and its rate and heat of reaction with many deposits, are very high. Therefore sulfuric acid must be handled with great care. In fact, these disadvantages are so severe that they eliminate sulfuric acid as a viable obstruction-removing agent in many circumstances.

Jones, in U.S. Pat. No. 4,116,664, disclosed that the addition of urea to sulfuric acid to form certain combinations of urea and sulfuric acid resulted in a product which was non-toxic, non-caustic, and non-corrosive to black iron and that, therefore, it could be safely transported, handled, stored, and applied, as a fertilizer, with ordinary equipment. Both Jones, supra, and Verdegaal et al. (U.S. Pat. 4,310,343) disclose methods for producing certain combinations of urea and sulfuric acid. In particular, Verdegaal et al. disclose methods of manufacturing urea-sulfuric acid compositions which contain at least 50 weight percent urea. Other authors have also discussed the nature and manufacture of combinations of urea and sulfuric acid. For instance, D. F. du Toit, Verslag Akad. Wetenschappen, 22, 573–4 (abstracted in Chemical Abstracts, 8, 2346, 1914) and L. H. Dalman, "Ternary Systems of Urea and Acid" JACS, 56, 549–53 (1934), disclose that urea forms mono-and diurea "salts" with sulfuric acid. Dalman defined the phase relationships between the solid phase and saturated solutions containing urea and sulfuric acid at certain temperatures. While these authors described several characteristics of and methods for manufacturing combinations of urea and sulfuric acid, they did not observe that certain urea-sulfuric acid compositions are particularly active protenating and hydrolyzing agents in which the disadvantages customarily associated with sulfuric acid, such as its dehydrating, sulfonating, and oxidizing activity, are markedly reduced.

SUMMARY OF THE INVENTION

In the present invention, it has been found that acid-soluble and/or hydrolyzable obstructions can be removed from conduits by contacting such obstructions with a composition containing the reaction product of sulfuric acid and a chalcogen-containing compound having the empirical formula $R_1$—$CX$—$R_2$ wherein X is a chalcogen, $R_1$ and $R_2$ are independently chosen from hydrogen, $NR_3R_4$ or $NR_5$, with at least one of $R_1$ and $R_2$ being other than hydrogen, $R_3$ and $R_4$ are independently chosen from hydrogen or monovalent organic radicals, and $R_5$ is a divalent organic radical. Preferably, the molar ratio of the chalcogen-containing compound to sulfuric acid is about ¼ or more. Compositions in which the chalcogen compound/sulfuric acid molar ratio is less than 2, and particularly such compositions in which a substantial proportion of the sulfuric acid is present as the monoadduct of sulfuric acid and chalcogen compound, retain a substantial proportion, or essentially all, of the protenating and hydrolyzing activity of sulfuric acid, and that, accordingly such compositions are particularly useful for removing hydrolyzable deposits, such as protein and cellulose. I have also found that such compositions in which the $H_2O$/(chalcogen compound $+H_2SO_4$) molar ratio is less than about 2.5 even more actively and efficiently remove deposits from conduits, and that they are less corrosive and more stable than compositions in which the $H_2O$/(urea $+H_2SO_4$) molar ratio is significantly above 2.5. The useful compositions can contain optional non-aqueous polar solvents and/or surfactants which act as carriers and diluents for the acid component and which facilitate the activity of such components for the removal of obstructions containing hydrophobic substances.

As used herein, the term "obstructions" includes deposits that significantly impair fluid flow as well as those that do not. Thus, deposits that impair the function of the conduit in some other respect, such as heat transfer reduction in heat exchangers and boilers, can be removed by these methods The described chalcogen compound-sulfuric acid components have less dehydrating, oxidizing, and sulfonating activity than does free sulfuric acid, and their addition to water and other solvents is much less exothermic than is the admixture of sulfuric acid with such materials. Accordingly, the useful acid components are easier to handle than is sulfuric acid. They are less corrosive to conduit materials and are therefore less damaging. And they are more efficient than sulfuric acid since sulfuric acid combined with the described chalcogen compounds is not consumed by sulfonation, oxidation, and/or dehydration reactions. Thus, the useful components are more stable and efficient since less material is required to accomplish the same purpose. Acid components having chalcogen compound/sulfuric acid molar ratios below 2 are more active and efficient protenating and hydrolyzing agents for both organic and inorganic deposit components than are compositions which have molar ratios of 2 or higher. Compositions in which the $H_2O$/(chalcogen compound + $H_2SO_4$) molar ratio is below about 2.5 are even less corrosive and more stable than are compositions in which that molar ratio is substantially above 25. Accordingly, such compositions are even more active hydrolyzing and protenating agents for both organic and inorganic deposit components, and they are easier to handle and produce less damage to conduit materials.

DETAILED DESCRIPTION OF THE INVENTION

In accordance with the novel methods of invention, organic and/or inorganic obstructions in the interior of conduits are removed by contacting such deposits with a composition containing the reaction product of sulfuric acid and a chalcogen-containing compound having the empirical formula $R_1$—CX—$R_2$ wherein X is a chalcogen, $R_1$ and $R_2$ are independently chosen from hydrogen, $NR_3$ or $NR_5$, with at least one of $R_1$ and $R_2$ being other than hydrogen, $R_3$ and $R_4$ are independently chosen from hydrogen or monovalent organic radicals, and $R_5$ is a divalent organic radical. Preferably, the molar ratio of the chalcogen-containing compound to sulfuric acid is about ¼ or more. Hydrolyzable deposits, i.e. deposits containing significant amounts of hydrolyzable matter such as proteins, cellulose, etc., are preferably treated with compositions in which the chalcogen compound/$H_2SO_4$ molar ratio is less than 2 under conditions of contact time, temperature, and concentration sufficient to weaken or dissolve the obstruction and thereby facilitate or effect its removal from the conduit. Acid components in which the $H_2SO_4$ O/(chalcogen compound + $H_2SO_4$) molar ratio is below 2.5 are even more chemically stable and efficient protenating and hydrolyzing agents than are compositions in which that ratio is significantly above 2.5, and they remove obstructions from conduits more rapidly and efficiently than do compositions which have higher relative water concentrations. The useful chalcogen compound-sulfuric acid components also can contain surfactants and/or non-aqueous polar solvents which accentuate the activity of those components toward hydrophobic obstruction components. Such non-aqueous polar solvents also can serve as solvent-dispersants for the active component.

The novel methods of this invention can be employed to remove a wide variety of organic and inorganic obstructions from conduits including all materials subject to hydrolytic acid attack and/or which are otherwise reactive with sulfuric acid. Both natural and synthetic acid-reactive organic materials can be removed by the methods of this invention including protenaceous and cellulosic matter and natural and synthetic resins, varnishes, adhesives, algae, mold, shellac, etc. Typical protenaceous deposits include plant and animal matter such as process wastes, protenaceous products, gelatins, hair, animal hide, algae, mold, and others. Typical cellulosic deposit components include plant matter such as cotton, paper products, wood processing wastes, and plant matter such as grass, plant stubble, starches, and the like. Illustrative of typical inorganic deposits and deposit components are metal oxides, hydroxides, carbonates, thiocarbonates, sulfides, oxysulfides, and simple and complex organic and inorganic salts such as halides, sulfates, sulfites, bisulfites, phosphates, vanadates, molybdates, formates, oxylates, hypochlorites, oxyhalides such as iodates and perchlorates, silicates, metallosilicates such as calcium-magnesium silicate, metallocarbonates such as calcium-magnesium carbonate, nitrates, nitrides, nitrites, permanganates, phosphides, plumbates such as calcium plumbate, plumbites such as calcium plumbite, tungstates such as magnesium tungstate, aluminates, e.g., $NaAlO_2$, antimonates and thioantimonates, e.g., $NaSbO_3$, bismuthates, e.g., $NaBiO_3$, borates, chromates, haloborates, perhenates, e.g., $NaReO_4$, perruthenates, e.g., $KRuO_4$, uranates, e.g., $Na_2UO_4$, perurantes, e.g., $Na_2UO_5$, stannates, e.g., $Na_2SnO_3$, platinates and thioplatinates, metallo-sulfates, e.g., $CaK_2(SO_4)_2$, selenates, e.g., $CaSeO_4$, silicides such as calcium silicide, silicohalides such as calcium silicon fluoride, arsenates, e.g., $Cu_3(AsO_4)_2$, bromates such as copper bromate, cyanides, metallo-cyanides such as ferricyanides, metallo-halides, e.g., $CuCl_2 2KCl$, and the like. Probably the most common inorganic obstructions and deposit components outside of the chemical processing, mining, and petroleum industries, are corrosion and hard water deposits.

The methods of this invention can be used to remove obstructions from conduits constructed of a wide variety of materials including ferrous and nonferrous metals, plastics, elastomers, ceramics, wood, and glass, and structural materials lined with such substances. Typical ferrous metals include carbon steels, black iron, cast iron, stainless steels including both high and low alloy stainless steels containing chromium, molybdenum, nickel, vanadium, rare earth metals, and/or other components. Illustrative non-ferrous metals include aluminum, titanium, magnesium, zinc, tin, chromium, and materials plated with and/or alloyed with such metals.

Essentially, all plastic and elastomeric conduit materials can be treated by the methods of this invention with several exceptions. The chalcogen compound-sulfuric acid components hydrolyze nylons, rayons, cellulosics such as cotton, and protenaceous materials such as leathers and should not be employed to treat conduits constructed of or containing functioning components constructed of such materials. Typical plastic and elastomeric conduit structural materials include polyvinylchlorides, polyolefins such as polyethylene and polypropylene, polyacrylates, polystyrene, phenol-formaldehyde resins, styrene-butadiene elastomers, and other synthetic materials.

Illustrative of other suitable conduit structural materials are ceramics such as ceramic tiles, cement, and the like, and essentially all forms of wood and glass. It should be observed, however, that the acid components gradually hydrolyze wood; therefore, conduits containing essential components containing wood should be treated only under moderate conditions of time, temperature and concentration.

The methods of this invention can be employed to remove obstructions from all types of industrial, agricultural, municipal, and household fluid-handling equipment, including equipment designed to handle liquids and/or vapors. Such equipment includes conduits of all types and in-line equipment such as orifices, nozzles, valves, screens, filters, metering devices, heat exchange equipment radiators, boiler and furnace tubes, and wells including water, geothermal, oil, and water injection wells such as those employed in the Frasch sulfur process. Thus, the methods of this invention can be employed to remove obstructions from essentially all varieties of industrial process, water, and steam handling conduits and in-line equipment, municipal, household, and office water supply and drain systems, steam operated electrical generating systems, agricultural water supplies, e.g., irrigation systems, and the like.

The useful chalcogen compound-sulfuric acid components are combinations of sulfuric acid and a chalcogen-containing compound having the empirical formula $R_1-C_x-R_2$ wherein X is a chalcogen, $R_1$ and $R_2$ independently chosen from hydrogen, $NR_3R_4$ or $NR_5$, with at least one of $R_1$ and $R_2$ being other than hydrogen, $R_3$ and $R_4$ are independently chosen from hydrogen or monovalent organic radicals, and $R_5$ is a divalent organic radical. Preferably, the molar ratio of the chalcogen-containing compound to sulfuric acid is about ¼ or more. One of the monovalent radicals $R_3$ and $R_4$ can be hydrogen, and either or both of $R_3$ and $R_4$ can be any organic radical including alkyl, aryl, alkenyl, alkenylaryl, aralkyl, aralkenyl, cycloakyl, cycloalkenyl, or alkynyl unsubstituted or substituted with pendant functional groups such as hydroxyl, carboxyl, oxide, thio, thiol, or others, and they can contain acyclic or cyclic heteroatoms such as oxygen, sulfur, nitrogen, or others. $R_5$ can be any divalent organic radical such as alkdyl, ardyl, alkenydyl, alkyndyl, aralkdyl, and aralkend which may contain pendant atoms or substituents and/or acyclic or cyclic heteroatoms as described for $R_3$ and $R_4$. Preferably, both $R_1$ and $R_2$ are other than hydrogen, both $R_3$ and $R_4$ are selected from hydrogen or hydrocarbyl radicals which, in combination, contain about 10 carbon atoms or less, and X is preferably oxygen. Particularly preferred chalcogen-containing compounds are urea, thiourea, formamide, dimethylformamide, biuret, and combinations of these.

the chalcogens are elements of Periodic Group VIB and include oxygen, sulfur, selenium, tellurium, and polonium. Oxygen and sulfur are presently preferred due to low cost, availability, low toxicity and chemical activity, and oxygen is the most preferred The minimum concentration of the chalcogen-containing compound is prescribed by the specified molar ratios for the respective components Thus, it is defined by the requirement that the molar ratio of the chalcogen compound to sulfuric acid be at least about ¼. The molar ratio of water to the combination of chalcogen compound and sulfuric acid is preferably about 20 or less. Typically, however, the chalcogen compounds will be present at a concentration of at least about 5 weight percent, usually at least about 10 weight percent, generally about 10 to about 80 weight percent, and preferably at least about 20 weight percent of the total composition.

The chalcogen compound and sulfuric acid are present in proportions corresponding to a molar ratio of the chalcogen compound to sulfuric acid of at least about ¼, generally about 1 to about 10, and typically about 1 to less than 5. When this molar ratio is 1, it appears that one molecule of chalcogen compound is adducted with each molecule of acid to form what is known as the mono-adduct While the chalcogen compound-sulfuric acid reaction products described above are particularly useful for removing deposits containing major proportions of inorganic constituents, the monoadduct of sulfuric acid and the selected chalcogen compound are preferred for treating deposits containing significant amounts of hydrolyzable matter such as protenaceous and cellulosic matter. Such deposits are therefore preferably treated with compositions in which the chalcogen compound/sulfuric acid molar ratio is less than 2. Within this range of molar ratios, at least a portion of the sulfuric acid is present as the monoadduct I have found that the monoadduct of sulfuric acid efficiently and rapidly weakens and/or removes hydrolyzable obstructions in the interior of fluid conduits in the presence of water. In contrast, the diurea adduct of sulfuric acid, the only form which exists in mixtures that have urea/sulfuric acid molar ratios above 2, has much less ability to hydraulically attack acid-sensitive components, particularly the hydrolyzable materials such as protenaceous and cellulosic deposits Accordingly, when used to treat hydrolyzable deposits, the useful acid components will usually have chalcogen compound/sulfuric acid molar ratios of at least about ¼ and less than 2, generally about ¼ to about 7/4. The more preferred compositions, which contain less uncomplexed sulfuric acid, have chalcogen compound/sulfuric acid molar ratios of at least about 1/2, generally about ½ to about 3/2 The most preferred acid components have molar ratios of at least about 1/1 such that all of the sulfuric acid is complexed as either the mono- or diadduct. It is also preferable to assure that a substantial portion of the sulfuric acid is present as the mono- rather than the diadduct when treating hydrolyzable obstructions; thus, the most preferred compositions are those whose chalcogen compound/sulfuric acid molar ratio is within the range of about 1/1 to about 3/2.

The useful acid components should contain sufficient equivalent sulfuric acid to weaken or remove the treated obstruction within a reasonable period of time I have found that catalytic amounts of the described adducts, i.e., about 1 weight percent in aqueous or nonaqueous solutions, are sufficient for this purpose in many instances However, higher adduct concentrations produce higher rates of hydrolysis and/or acid attack of conduit obstructions and are often preferred, particularly for the treatment of deposits which contain hydrolyzable components such as protenaceous and cellulosic matter. Accordingly, the chalcogen compound and sulfuric acid, in combination, will usually constitute at least about 1, generally at least about 5, and preferably about 5 to 100 weight percent of the composition (in the presence or absence of other solvents, diluents, adjuvants, or other components). When more concentrated compositions are preferred for the treatment of more refractory obstructions and hydrolyzable components of such compositions, the chalcogen compound and sulfuric acid, in combination, will often constitute at least about 30, preferably at least about 60, and even 80 percent or more of the composition.

Water is a third essential component of compositions used for treating hydrolyzable matter, and it can be present in very minor amounts of at least about 0.2 weight percent. However, the useful acid components can also be very dilute, i.e., they can contain up to 99 weight percent water or more. Accordingly, water concentration can range from about 0.2 to about 99 weight percent but will generally be within the range of about 0.2 to about 90 weight percent, preferably about 0.5 to about 70 weight percent, based on the combined weight of the chalcogen compound, sulfuric acid, and water. Of course, the more concentrated acid components preferred for treating more refractory obstructions will contain correspondingly lower water concentrations. Compositions particularly preferred for the treatment of more refractory and/or hydrolyzable obstructions have $H_2O$/(chalcogen compound $+H_2SO_4$) molar ratios below 2.5 since such compositions are substantially more effective for the removal of such obstructions. The chalcogen compound and sulfuric acid, in combination, constitute at least about 60 weight percent of these preferred components. Without being constrained to any particular theory explaining this effect, and without limiting the scope of this invention thereby, it appears that the presence of sufficient water to provide 3 or more moles of water per mole of urea and 2 or more moles of water per mole of sulfuric acid (the amount of water required to hydrate those respective components) attenuates the activity of the acid component for the protonic-hydrolytic attack of refractory and/or hydrolyzable deposits.

As discussed in my copending application Ser. No. 673,508, THERMALLY STABLE UREA-SULFURIC ACID COMPOSITIONS AND METHODS OF MANUFACTURE, filed Nov. 20, 1984, incorporated herein by reference in its entirety, urea-sulfuric acid compositions which contain less than about 1 weight percent water (based on water, urea and sulfuric acid) are much more thermally stable than are compositions having substantially higher water concentrations. For instance, urea-sulfuric acid compositions which have urea/sulfuric acid molar ratios of about 1 and contain about 10 weight percent water have incipient decomposition temperatures of about 176° F. (80° C.) and decompose explosively at about 190° to 200° F. (about 90° C.). Incipient decomposition temperature is that temperature at which the adduct begins to decompose as indicated by effervescence ($CO_2$ evolution) and/or discoloration as discussed in my above referenced application Ser. No. 318,629 incorporated herein by reference in its entirety. In contrast, otherwise identical compositions which contain about 1 weight percent water or less can be heated to temperatures above 80° C. and even above 90° or 100° C. without incipient decomposition. The advantages of employing such low water-content compositions are evident when it desired to treat a conduit obstruction at temperatures of 80° C. or higher.

The useful chalcogen compound-sulfuric acid components may optionally contain other components which do not negate the activity of the composition for weakening or removing obstructions. In fact, compositions containing polar solvents (other than water) and/or surfactants are sometimes preferred particularly for treating deposits or obstructions containing hydrophobic substances such as lignins, fatty materials, e.g., lipids, and the like. Illustrative solvents include organic and inorganic solvents in which both the chalcogen compound and sulfuric acid are soluble such as dimethylsulfoxide, alcohols, e.g., methanol glycol, etc., acetone, methylethylketone, tetrahydrofuran, halogenated hydrocarbons such as trichloromethane and chloroform, and the like. One or more of such polar solvents can be present over a wide range of concentration and usually within the range of about 2 to about 95 weight percent based on the combined weight of solvents, chalcogen compound, sulfuric acid, and water.

Suitable surfactants are discussed in my copending application Ser. No. 453,496, ACID CATALYZED REACTIONS AND COMPOSITIONS FOR USE THEREIN, filed Dec. 27, 1982 incorporated herein by reference in its entirety. Illustrative of useful surfactants are nonionics such as the alkylphenol polyethylene oxides, anionics such as the long-chain alkylsulfonates, and cationics such as 1-hydroxyethyl-2-heptadecenyl gloxalidin. Of these, the polyethylene oxide nonionic surfactants are particularly preferred. Illustrative of preferred specific surfactants is the nonionic surfactant marketed by Thompson-Hayward, Inc., under the trademark T-MULZ 891. Surfactants can be employed over a wide range of concentrations usually of at least about 0.1 weight percent and typically about 0.1 to about 10 weight percent based on the combined weight of surfactant, chalcogen compound, sulfuric acid, water, and polar solvent.

The useful acid components can also contain corrosion inhibitors, and such inhibitors are particularly preferred when the composition of the treated conduit is subject to acid attack. Corrosion inhibitors particularly suitable for use in these compositions are discussed in my U.S. Pats. No. 4,404,116 and 4,402,852, both of which were filed December 15, 1981 and are incorporated herein by reference in their entireties.

The chalcogen compound-sulfuric acid components can be prepared by mixing chalcogen compound and the selected solvent(s) (if any), sulfuric acid, and optionally water, under conditions sufficient to avoid excessive heating due to the heat of dilution and adduct formation. The heats of dilution and adduct formation are so great that the amount of heat released (particularly in the manufacture of solutions having higher sulfuric acid concentrations) can cause the mixture to boil, explode, and/or exceed the thermal decomposition temperature of the chalcogen compound, acid or the acid adduct. Procedures suitable for manufacturing even the more concentrated solutions of urea and sulfuric acid and for determining incipient decomposition temperature are discussed in my U.S. Pats. No. 4,397,675 and 4,445,925, incorporated herein by reference in their entireties. While those patents were specifically directed to the manufacture of concentrated, aqueous urea-sulfuric acid solutions, the procedures described therein can also be employed to control the substantial exotherms involved in the production of other chalcogen compound-sulfuric acid components in water or other solvents.

The solvent, when used, should have sufficient affinity for both the chalcogen compound and acid to dissolve the desired proportions of each component and should not be reactive with either reactant. Illustrative of suitable solvents are polar solvents such as water, dimethylsulfoxide (DMSO), methanol, glycol, methylethylketone (MEK), trichloromethane, and the like. Solutions of the chalcogen compound in excess sulfuric acid, with or without additional solvent, can also be employed. Water is the most preferred solvent due to its affinity and lack of reactivity with both sulfuric acid and the chalcogen compounds.

The obstruction to be removed should be contacted with a sufficient quantity of the described acid component to completely contact all exposed portions of the obstruction for a period of time and at a temperature sufficient to at least significantly weaken, if not remove, the obstruction. Such contacting can be efficiently achieved by either spraying the obstruction, i.e., the interior of the fouled conduit, or filling the affected portion of the conduit with the selected acid component. Contact times of as little as 1 minute are adequate to significantly weaken the more susceptible obstructions such as the inorganic materials referred to above, particularly when treated with the more concentrated acid components at higher temperatures. However, contact times of at least about 5 minutes are generally employed. Longer contact times are, of course, required to remove larger obstructions and to remove more refractory materials such as protenaceous and cellulosic deposits or plugs, particularly when such obstructions contain hydrophobic substances. Thus, contact times will usually range from about 1 minute to about 48 hours, typically about 5 minutes to about 24 hours, and preferably at least about 10 minutes to about 24 hours.

The useful urea-sulfuric acid components will chemically attack and weaken all of the types of obstructions referred to above at relatively low temperatures, e.g., 0° C. However, reaction rate increases as temperature is increased. Thus, contacting temperatures will usually range from about 0° C. to about 80° C. with acid components which contain substantially more than 1 weight percent water. However, as mentioned above, thermally stable urea components can be employed which contain about 1 weight percent water or less. Such thermally stable components can be contacted with deposits at temperatures in excess of 80° C. or, if desired, in excess of 90° C. or even 100° C. or higher.

The invention is further described by the following examples which are illustrative of specific modes of practicing the invention and are not intended as limiting the scope of the invention as defined by the appended claims.

EXAMPLE 1

Approximately one gram of magnesium carbonate was formed into a hard pellet and dropped into 100 ml. of aqueous 49 weight percent sulfuric acid. The magnesium carbonate pellet reacted explosively with the acid with a violent release of gas and significant temperature elevation (5° C.) indicating rapid heat evolution. The pellet had completely dissolved in less than one minute.

EXAMPLE 2

Approximately one gram of magnesium carbonate was formed into a hard pellet and dropped into an aqueous solution of a urea-sulfuric acid reaction product containing 2 weight percent equivalent urea, 49 weight percent equivalent sulfuric acid and 19 weight percent water having a urea/$H_2SO_4$ molar ratio of 1 07 The magnesium carbonate pellet gradually dissolved in the solution with slow gas evolution and in the absence of any violent reaction and any noticeable temperature increase.

EXAMPLE 3

A one-inch U-trap sink drain plugged with hair and hard water soap residue can be unplugged by pouring into the drain 400 grams of a solution of urea and sulfuric acid in water having a urea/sulfuric acid molar ratio of 1 and a $H_2O$/(urea $+H_2SO_4$) molar ratio of 2 containing 5 weight percent T-MULZ 891 and contacting the deposit for 30 minutes at 25° C.

EXAMPLE 4

Hard water deposits obstructing the interior of ½-inch I.D. No. 310 stainless steel heat exchanger tubes can be removed by filling the tubes with a urea-sulfuric acid component having a urea/$H_2SO_4$ molar ratio of 1.4 containing 20 weight percent water and 80 weight percent of the combination of urea and sulfuric acid for 1 hour at 70° C.

EXAMPLE 5

Mineral and rust deposits can be removed from the interior of a 2-inch I.D. carbon steel pipe by contacting the deposits for 30 minutes at 90° C. with a substantially anhydrous urea-sulfuric acid composition containing 39.5 weight percent urea and 60.5 weight percent sulfuric acid.

EXAMPLE 6

Mineral deposits can be removed from the interior of a geothermal well hot brine production tubing by contacting the deposits for one hour with an aqueous formamide-sulfuric acid reaction product solution containing weight percent equivalent formamide, 50 weight percent equivalent sulfuric acid, and 26 weight percent water.

EXAMPLE 7

Corrosion and water deposits can be removed from the interior of an automotive radiator by filling the radiator with a solution of a biuret-sulfuric acid reaction product containing 27.5 equivalent weight percent biuret, 24.5 equivalent weight percent sulfuric acid, and 48 weight percent methylethylketone at 40° C. for 30 minutes.

EXAMPLE 8

Corrosion and hard water deposits can be removed from the interior of an automotive radiator by filling the radiator with a solution of a thioformamide-sulfuric acid reaction product in dimethylsulfoxide containing 30 weight percent equivalent thioformamide, 46 weight percent equivalent sulfuric acid, and 24 weight percent dimethylsulfoxide at 30° C. for 30 minutes.

EXAMPLE 9

Mineral deposits can be removed from the interior of glass tubing by contacting the deposits for 30 minutes at 22° C. with a solution of the N-allyl thioformamide adduct of sulfuric acid containing 50 grams equivalent N-allyl thioformamide, 50 grams equivalent sulfuric acid, 200 ml. diethylether and 200 ml. water.

EXAMPLE 10

Corrosion and hard water deposits can be removed from the interior of copper tubing by contacting the deposits for 30 minutes at 25° C. with the 1-(4-aminobenzenesulfonyl)-2 -thiourea adduct of sulfuric acid containing 21 grams equivalent sulfuric acid, 50 grams equivalent 1-(4-aminobenzenesulfonyl)-2-thiourea, 200 ml. diethylether, and 200 ml. water.

EXAMPLE 11

Mineral deposits and mold can be removed from the interior of glass tubing by contacting the deposits for 30 minutes at 22° C. with a solution of the 1-benzoylurea adduct of sulfuric acid containing 30 grams equivalent sulfuric acid, 50 grams equivalent 1-benzoylurea, 200 ml. diethylether and 200 ml. water.

Example 12

Hard water deposits can be removed from the interior of PVC sprinkler line, valves and spray heads by filling the tubing, valves and spray heads for 30 minutes with an aqueous solution of a urea-sulfuric acid reaction product containing 30 weight percent equivalent urea, 13.6 weight percent equivalent sulfuric acid and 56.4 weight percent water having a urea/$H_2SO_4$ molar ratio of 3.6, and then rinsing the entire system with fresh water.

While particular embodiments of the invention have been described, it will be understood, of course, that the invention is not limited thereto since many obvious modifications can be made, and it is intended to include within this invention any such modifications as will fall within the scope of appended claims.

Having described my invention, I claim:

1. A method for removing a cellulose- and/or carbonic-containing deposit o obstruction from the interior of a conduit, which comprises contacting said deposit or obstruction with a composition comprising the mono- and/or diadduct of sulfuric acid and a chalcogen-containing compound having the empirical formula $R_1$—$Cx$ —$R_2$, wherein X is 0 or S, each of $R_1$ and $R_2$ is independently selected from the group consisting of hydrogen, $NR_3R_4$ and $NR_5$, with at least one of $R_1$ and $R_2$ being other than hydrogen, each of $R_3$ and $R_4$ is independently selected from the group consisting of hydrogen and monovalent organic radicals, and $R_5$ is a divalent organic radical, the equivalent molar ratio of said chalcogen-containing compound to sulfuric acid being at least about 1.

2. A method for removing a cellulose- and/or carbonate-containing deposit or obstruction from the interior of a conduit, which method comprises contacting said deposit or obstruction with a composition comprising the mono- and/or diadduct of sulfuric acid and a chalcogen-containing 2compound, other than substituted and unsubstituted formamides and thioureas, having the empirical formula $R_1$—$CX$—$R_2$, wherein X is 0 or S, each of $R_1$ and $R_2$ is independently selected from the group consisting of hydrogen, $NR_3R_4$ and $NR_5$, with at least one of $R_1$ and $R_2$ being other than hydrogen each of $R_3$ and $R_4$ is independently selected from group consisting of hydrogen and monovalent organic radicals, and $R_5$ is a divalent organic radical, the equivalent molar ratio of said chalcogen-containing compound to sulfuric acid being g at least about 1.

3. A method for clearing a cellulose- and/or carbonate-containing obstruction or deposit from the interior of a conduit, which method comprises contacting said obstruction or deposit with a composition comprising the mono- and/or diurea adduct of sulfuric acid, in which the urea/$H_2SO_4$ molar ratio is at least about 1.

4. The method defined in claim 3, wherein said deposit or obstruction comprises a member selected from the group consisting of metal carbonates.

5. The method defined in claim 1 or 2 wherein said chalcogen compound is selected from the group consisting of urea, formamide, dimethylformamide, biuret, and combinations thereof.

6. The method defined in any one of claims 1, 2 or 37, wherein said X is oxygen

7. The method defined in any one of claims 1, 2 or 37, wherein said deposit or obstruction further comprises a member selected from the group consisting of corrosion, hard water deposits, and combinations thereof.

8. The method defined in ny one of claims 1, 2 or 37, wherein said composition is free of unadducted sulfuric acid.

9. The method defined claim 8 wherein said molar ratio is within the range of 1 or about 10.

10. The method define claim 8 wherein said molar ratio is within the range of 1 to less than 2.

11. The method defined in claim 8 wherein said composition further comprises a member selected from the group consisting of surfactants, solvents other than water, and combinations thereof.

12. The method defined in claim 8 wherein said conduit is selected from industrial, domestic and municipal conduits.

13. The method defined in claim 8 wherein said adduct constitutes at least about 5 weight percent of said composition.

14. The method defined in claim 8 wherein said composition comprises about 1 weight percent water or less based on the combined weight of said chalcogen compound and sulfuric acid.

15. The method defined in claim 10, wherein said composition is contacted with said deposit or obstruction at a temperature above 80° C.

16. The method defined in claim 14 wherein said composition is contacted with said deposit or obstruction at a temperature above 90° C.

* * * * *

UNITED STATES PATENT AND TRADEMARK OFFICE
CERTIFICATE OF CORRECTION

PATENT NO. : 4,993,442

DATED : February 19, 1991

INVENTOR(S) : Donald C. Young

It is certified that error appears in the above-identified patent and that said Letters Patent is hereby corrected as shown below:

Claim 1, column 11, line 30, "o" should be -- or --; line 31, after the word "which" insert -- method --; line 35, "Cx" should be -- CX --;

Claim 2, column 12, line 2, after the word "from" insert --the--;

Claim 6, column 12, line 20, "37" should be -- 3 --;

Claim 7, column 12, line 22, "37" should be -- 3 --;

Claim 8, column 12, line 26, "ny" should be -- any --; "37" should be -- 3 --;

Claim 15, column 12, line 47, "10" should be -- 14 --.

Signed and Sealed this

Eleventh Day of August, 1992

*Attest:*

DOUGLAS B. COMER

*Attesting Officer*   *Acting Commissioner of Patents and Trademarks*